US008082067B2

(12) United States Patent
Nicoson

(10) Patent No.: US 8,082,067 B2
(45) Date of Patent: Dec. 20, 2011

(54) METHOD AND SYSTEM OF CONTROLLING A HYDROELECTRIC PLANT

(75) Inventor: Reginald L. Nicoson, Windsor, CO (US)

(73) Assignee: General Electric Company, Schenectady, NY (US)

( * ) Notice: Subject to any disclaimer, the term of this patent is extended or adjusted under 35 U.S.C. 154(b) by 444 days.

(21) Appl. No.: 12/330,877

(22) Filed: Dec. 9, 2008

(65) Prior Publication Data

US 2010/0140934 A1 Jun. 10, 2010

(51) Int. Cl.
*G06F 19/00* (2006.01)

(52) U.S. Cl. .......................................... 700/290; 290/43

(58) Field of Classification Search .................. 700/290, 700/287; 290/43, 40 R, 52; 415/1, 17
See application file for complete search history.

(56) References Cited

U.S. PATENT DOCUMENTS 4,109,160 A * 8/1978 Goto et al. ...................... 290/52
4,788,647 A * 11/1988 McManus et al. ............ 700/287
4,791,309 A * 12/1988 Payne et al. ................. 290/40 R

* cited by examiner

*Primary Examiner* — Kidest Bahta

(74) *Attorney, Agent, or Firm* — Dale J. Davis; Ernest G. Cusick; Frank A. Landgraff

(57) ABSTRACT

An embodiment of the present invention may incorporate an adaptive model based control (MBC) for determining a physical parameter including: generator output, head, generator speed, or the like. The adaptive MBC may reduce the need for pre-defined control curves. The adaptive MBC may receive a plurality of data on the hydroelectric plant, and then builds a new operating model, based on that data, which controls the operation of a hydroelectric plant. This model may then be used to forecast and/or control an output variable including the generator output of the hydroelectric plant. The MBC of an embodiment of the present invention may be configured to automatically and/or continuously monitor the hydroelectric plant to determine whether the output parameter is within a desired range.

17 Claims, 3 Drawing Sheets

100
120
125
140
165
(135)h
110
150
155
145
110
130
160

100
(135)h
165
145
160
155
140
150
130
120
125
110
110

205
Hydroeletric Plant Generating Power
210
Permissive Satisfied?
No
Yes
230
Model Data Storage
215
Receive A Plurality Of Data
225
Retrieve Model Data
220
Model Data Available?
No
235
Determine Output Variable
240
Store Model
No
245
Manual Abort?
Yes
250
Permissive Maintained?
No
Yes
200

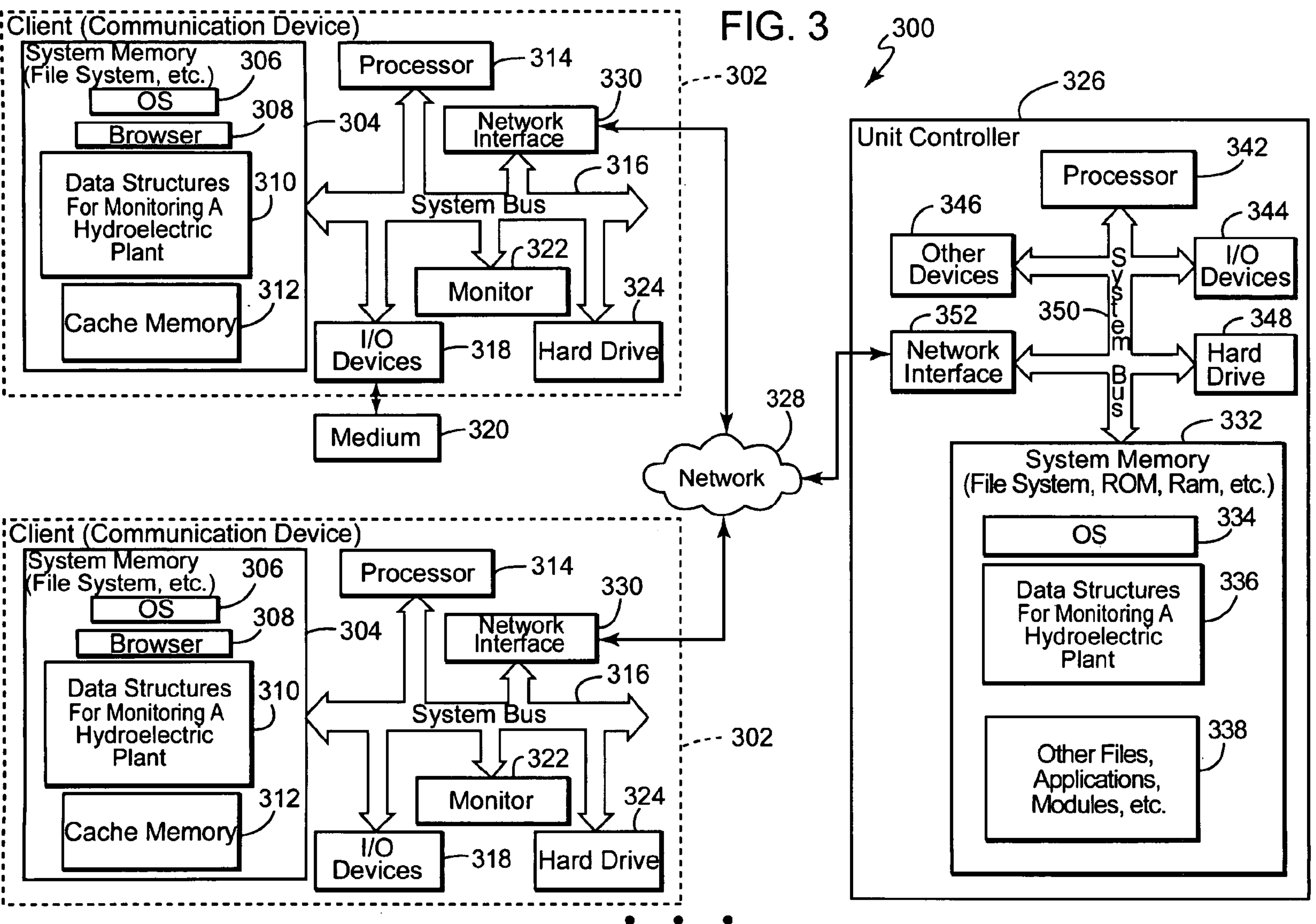
FIG. 3
300
Client (Communication Device)
302
System Memory (File System, etc.)
304
OS
306
Browser
308
Data Structures For Monitoring A Hydroelectric Plant
310
Cache Memory
312
Processor
314
Network Interface
330
System Bus
316
Monitor
322
I/O Devices
318
Hard Drive
324
Medium
320
Network
328
Unit Controller
326
Processor
342
Other Devices
346
I/O Devices
344
Network Interface
352
System Bus
350
Hard Drive
348
System Memory (File System, ROM, Ram, etc.)
332
OS
334
Data Structures For Monitoring A Hydroelectric Plant
336
Other Files, Applications, Modules, etc.
338

METHOD AND SYSTEM OF CONTROLLING A HYDROELECTRIC PLANT

BACKGROUND OF THE INVENTION

The present invention relates to the operation of a hydroelectric plant, and more particularly to an adaptive method for controlling the operation of a hydroelectric plant.

The operation of the hydroelectric plant may be indirectly controlled by the frequency of an electrical grid that the generator is synchronized. The hydroelectric plant should respond to a load change, such as a step-change demand, in a appropriate manner allowing for maintaining the frequency within an allowable range.

Some hydroelectric plants use a control system that has an online control mode that uses a physical parameter as a control variable. The physical parameter may include, but is not limited to, generator output. The control system may incorporate different control philosophies; which may include: a Proportional-Integral-Derivative (PID) control algorithm; a programmed control curve that may be integrated with the PID; or the like.

The PID control algorithms typically use generator output as a process variable and a gate position as a control variable. Generally, this control philosophy requires high integral gains in order to respond effectively to a load setpoint change. PID control algorithms may be sufficient for large electrical grid applications. However, PID control algorithms may be insufficient for hydroelectric plants operating; in an isochronous mode, a small grid system, or an isolated power system. Moreover, if the hydroelectric plant is operated in those environments, the loading rate is relatively slow as the integral gains require compensating for those operating environments.

Generally, the programmed control curve philosophy incorporates pre-developed curve data that is used with a form of the PID control algorithm that incorporates feed-forward logic. The feed-forward logic may comprise a load ramping algorithm that incorporates the curve data to determine an opening position for a generator output setpoint and/or head value. The goal of the PID feed-forward logic may be to achieve a relatively fast and smooth response to load setpoint changes. The load ramping algorithm may incorporate the pre-programmed curve data to determine where the at least one opening should be positioned for a given load setpoint.

Although the PID feed-forward logic, described here may be beneficial. Older hydroelectric plants do not have pre-programmed curve data available. Furthermore, the high cost and time associated with upgrading the control system on these units prohibit the upgrade.

For the foregoing reasons, there is a need for a method and system of controlling a hydroelectric plant in a manner that provides for a relatively smooth and quick response to a load setpoint change, and allows for speed regulation during grid frequency disturbances, such as droop control. The method and system should not control require higher integral gains. The method and system should not require pre-programmed curves. The method and system should be adaptable to different operating environments, such as isochronous, small grids, large grids, isolated operation, or the like. The method and system should be adaptable to different hydroelectric turbine: designs, turbine mass, head value, or the like.

BRIEF DESCRIPTION OF THE INVENTION

In accordance with an embodiment of the present invention, a method of controlling a hydroelectric plant, the method comprising: providing a hydroelectric plant comprising a plurality of components; receiving a plurality of operating data on the hydroelectric plant; developing an operating model from the plurality of operating data; and utilizing the operating model to determine an operation variable; wherein the operation variable partially controls at least one of the plurality of components.

The plurality of components may comprise at least one of: at least one opening for controlling the flow of water, at least one servo-motor for controlling the at least one opening, a turbine, and a generator, or combinations thereof. Furthermore, the plurality of operating data comprises data on at least one of: command data or feedback data.

In accordance with an embodiment of the present invention, a system for controlling a hydroelectric plant, the system comprising: a hydroelectric plant comprising at least one of: at least one opening for controlling the flow of water, at least one servo-motor for controlling a movement of the at least one opening, a turbine for converting a potential energy of the water into a kinetic energy, and a generator for converting the kinetic energy into an electrical energy; a control system for controlling the operation of the hydroelectric plant; wherein the control system comprises at least one processor, wherein the at least one processor is configured to: receives a plurality of operating data on the hydroelectric plant; develop an operating model from the plurality of operating data; and utilize the operating model to determine an operation variable; wherein the operation variable partially controls at least one of the plurality of components.

BRIEF DESCRIPTION OF THE DRAWINGS

FIG. 3 is a block diagram of an exemplary system of controlling a hydroelectric plant in accordance with an embodiment of the present invention.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

The present invention may be applied to hydroelectric plants used in a wide variety of applications including, but not limiting of, large electrical grids, small electrical grids, stand-alone operation, isochronous operation, and the like. An embodiment of the present invention takes the form of an application and process that may incorporate an adaptive controls philosophy.

An embodiment of the present invention has the technical effect of controlling the operation of a hydroelectric plant. An embodiment of the present invention may use an adaptive model based system to control a physical parameter of a hydroelectric plant in operation.

Figure 1:
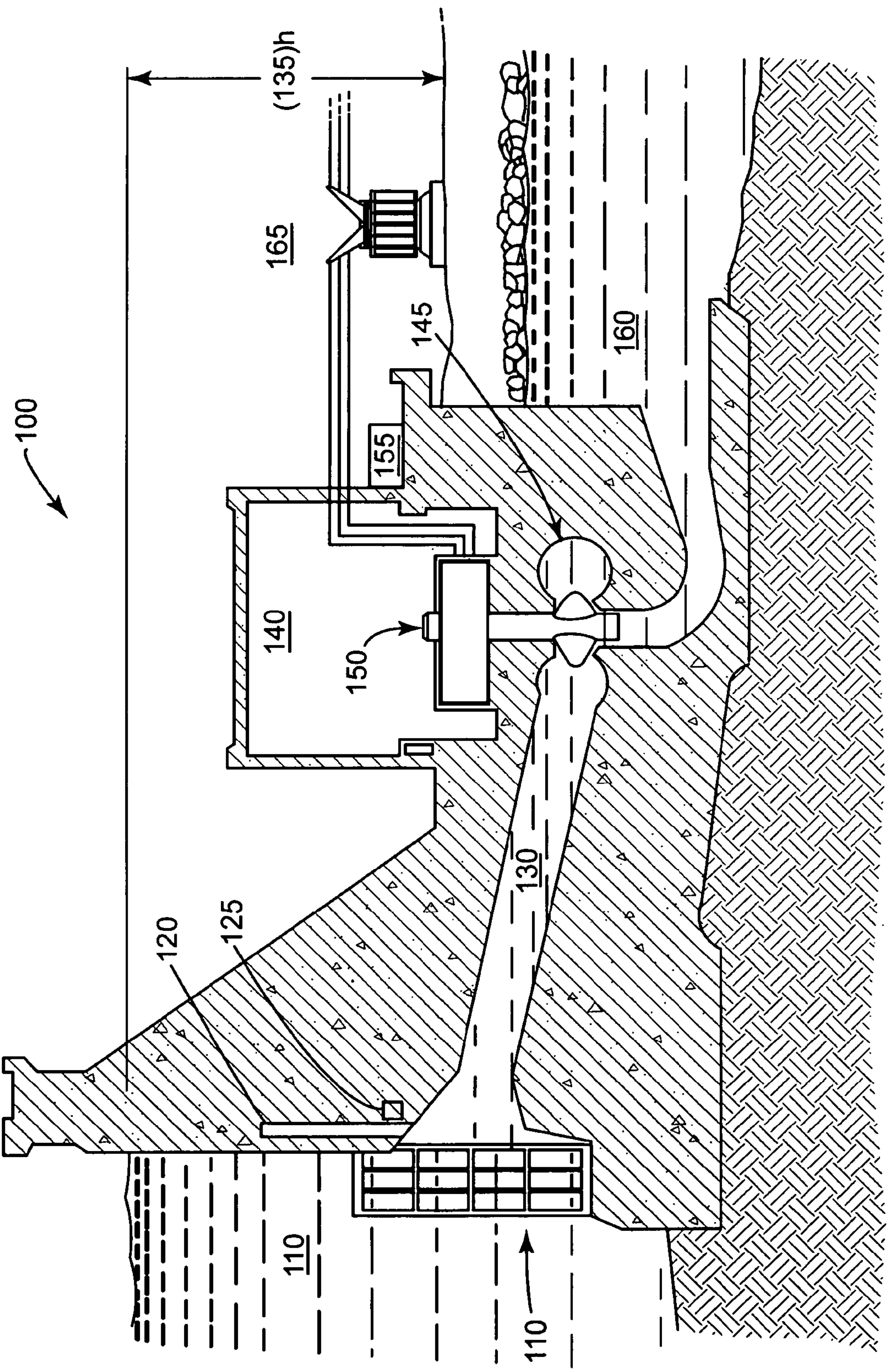
FIG. 1 is a schematic illustrating an operating environment that an embodiment of the present invention may operate.

Referring now to the Figures, where the various numbers represent like elements throughout the several views. FIG. 1 is a schematic illustrating an operating environment that an embodiment of the present invention may operate. FIG. 1 illustrates a generic Francis or Kaplan type of hydroelectric turbine. The applicability of embodiments of the present invention are not intended to be limited to Francis or Kaplan types of hydroelectric turbines. An embodiment of the present invention may be applicable to any type of hydroelectric turbine, such as, but not limiting of, an impulse type.

Generally, the hydroelectric plant 100 of FIG. 1 may be integrated with a dam and located between multiple bodies of water. The hydroelectric plant 100 utilizes the elevation differences between the multiple bodies of water to create energy. The elevation differences or head 135 is represented by "h" 135 in FIG. 1.

FIG. 1 illustrates a hydroelectric plant 100 comprising an intake area 105 area located adjacent an upstream portion of the dam; a screen 110 for blocking some foreign objects from entering the turbine 145. At least one opening 120 for allowing the fluid to enter the turbine 145 that may be located downstream of the screen 110. The at least one opening may comprise the form of: a wicket gate, guide vane, valve, or the like.

Typically, the at least one opening 120 determines the volume of water entering the turbine 145. A position of the at least one opening 120 may be controlled by at least one motor 125. In an embodiment of the present invention, the at least one motor 125 may comprise a positioning servo integrated with a control system 155. A penstock 130 for channeling the water towards the turbine 145 may be located downstream of the at least one opening 120.

The turbine 145 may serve to convert the potential energy of the water into kinetic energy. The turbine 145 may be located at a downstream end of the penstock 130, is rotated by the received channeled water, which then flows downstream becoming the discharge 160. A generator 150 for converting the kinetic energy into electrical energy may be coupled to the turbine 145. A powerhouse 140 may house the turbine 145 and the generator 150. The generator 150 may be synchronized to a grid system 165.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

An embodiment of the present invention may incorporate an adaptive model based control (MBC) for determining a physical parameter, such as, but not limiting of, generator output, head, generator speed, or the like. The adaptive MBC may reduce the need for pre-defined control curves. The adaptive MBC may receive a plurality of data on the hydroelectric plant 100 and then build an operating model. This model may then be used to forecast and/or control an output variable, such as, but not limiting of, a generator output of the hydroelectric plant 100.

The control system 155 of an embodiment of the present invention may be configured to automatically and/or continuously monitor the hydroelectric plant 100 to determine whether a physical parameter is within a desired range. Alternatively, the control system 155 may be configured to require a user action to the initiate operation. An embodiment of the control system 155 of the present invention may function as a stand-alone system. Alternatively, the control system 155 may be integrated as a module, or the like, within a broader system, such as a turbine control or a plant control system.

Figure 2:
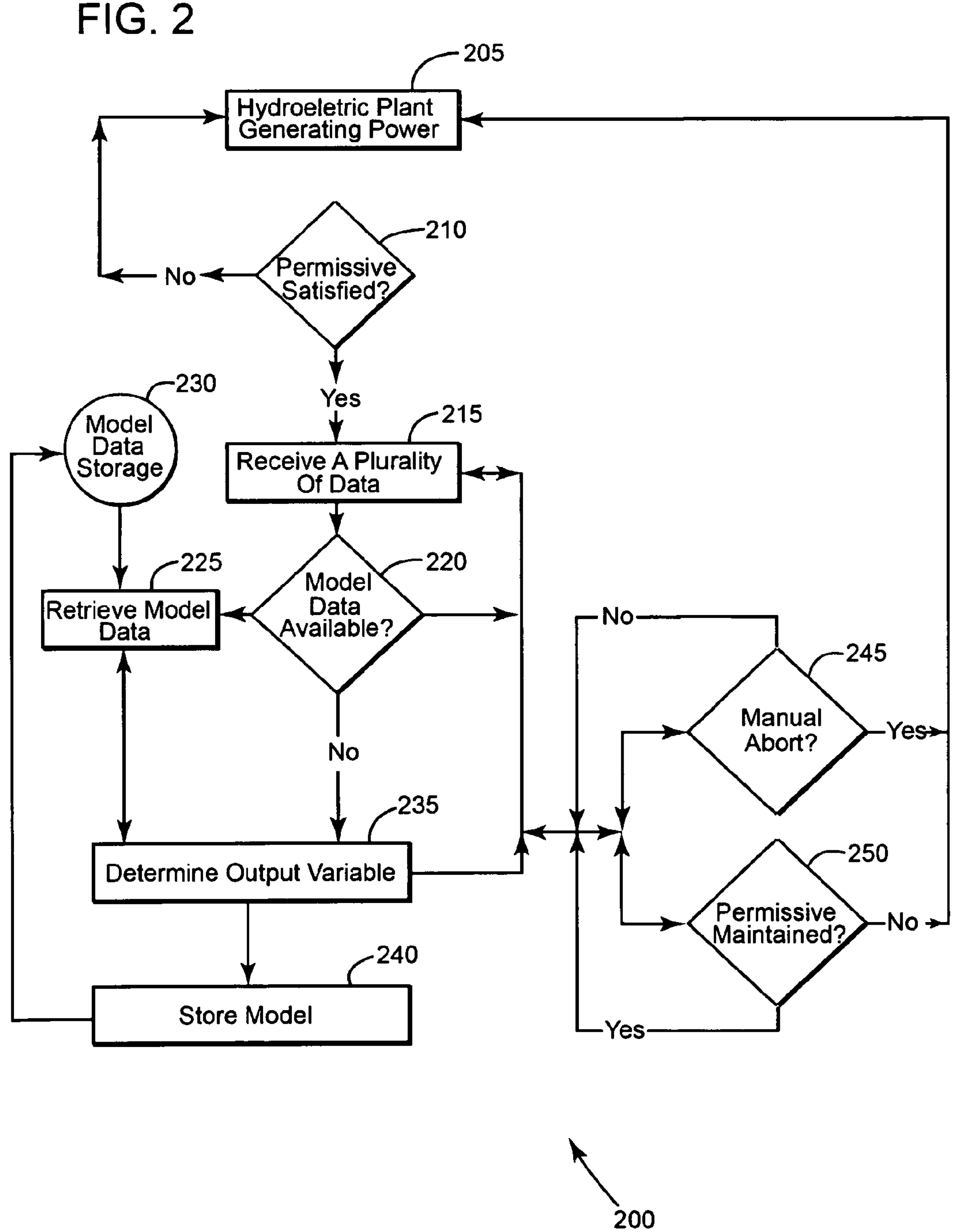
FIG. 2 is a flowchart illustrating a method of controlling a hydroelectric plant in accordance with an embodiment of the present invention.

FIG. 2 is a flowchart illustrating a method of controlling a hydroelectric plant 100 in accordance with an embodiment of the present invention. In an embodiment of the present invention, the control system 155 that implements the method 200 may be integrated with a graphical user interface (GUI), or the like. The GUI may allow the operator to navigate through the method 200 described below. The GUI may also provide at least one notification of the status of the hydroelectric plant 100. The method 200 may be adapted to control the operation of a variety of configurations of hydroelectric plants 100

In step 205, of the method 200, the hydroelectric plant 100 may be generating power. Depending on either the type and/or operation of the hydroelectric plant 100, the power may comprise electricity for exporting to a grid system 165, mechanical torque, or combinations thereof.

In step 210, the method 200 may determine whether at least one permissive is satisfied. An embodiment of the present invention may require that the at least one permissive is satisfied before an embodiment of the algorithms of the adaptive MBC function. The permissive may generally be considered a requirement or preferred condition that confirms the hydroelectric plant 100 may use the adaptive MBC function. In an embodiment of the present invention, the user may define the at least one permissive. For example, but not limiting of, the at least one permissives may comprise a status of the hydroelectric plant, a status of a head feedback signal, a status of a generator megawatt feedback signal, a status of a servo-motor feedback signal, a generator frequency feedback signal, or combinations thereof. If the at least one initialization permissive is satisfied then the method 200 may proceed to step 215; otherwise the method 200 may revert to step 205 until the at least one initialization permissive is satisfied.

In step 215, the method 200 may receive a plurality of operating data. This data may comprise at least one of: command data or feedback data. The command data may comprise data on at least one of: a head setpoint, a generator output setpoint, a servo-motor demand setpoint, or combinations thereof. The feedback data may comprise data on at least one of: a head value, a generator megawatt value, a servo-motor position value, a generator frequency value, or combinations thereof.

In step 220, the method 210 may determine whether data from a previous operation of the adaptive MBC systems may be available. This information may be integrated into a current MBC model or may be used in the development of a new MBC model. If model data is available then the method 200 may proceed to step 225; otherwise the method 200 may proceed to step 235.

In step 225, the method 200 may retrieve the model data. In an embodiment of the present invention, the method 200 may retrieve the model data from an internal memory, or the like. In an alternate embodiment of the present invention, the method 200 may retrieve the model data from an independent source. In step 230, the method 200 may retrieve model data from model data storage, such as, but not limiting of, a library, or the like. Here, the model data may derive from an independent source, such as, but not limiting of, another system integrated with the control system 155.

In step 235, the method 200 may determine an output variable. The output variable may be considered a physical parameter, such as, but not limiting of, a generator output setpoint, a head setpoint, etc. Generally, the adaptive MBC algorithm, of an embodiment of the present invention, may incorporate the plurality of operating data received in step 215 as inputs for updating an existing or for creating a new model. The model may determine a setting for the physical parameter.

For example, but not limiting of, if a user desires a specific generator output, the adaptive MBC may incorporate input data such as, but not limiting of: generator output feedback, head, position of the at least one servo-motor 120. Here, the adaptive MBC may use generator output setpoint, head, and the servo-motor position for the at least one opening 120 to estimate the feedback of the generator output. The adaptive MBC may then determine a setpoint for the at least one opening. Concurrently, the adaptive MBC may maintain frequency control of the generator 150 utilizing a droop control, isochronous control, or the like.

In step 240, the method 200 may store the current model processed by the adaptive MBC. Here, the current model may be stored in internal memory. In an embodiment of the present invention, the current model may be stored in the model data storage as discussed in step 230.

In step 245, the method 200 may allow for aborting the operation of the adaptive MBC. As illustrated in FIG. 2, the operation of the adaptive MBC may be aborted after the plurality of operating data is received in step 215. An embodiment of the present invention, may allow for a user to manually abort the operation of the adaptive MBC. Alternatively, the method 200 may be integrated with a system that allows for the automatic aborting of the operation of the adaptive MBC. If the operation of the adaptive MBC is aborted, then the method 200 may revert to step 205, otherwise the method 200 may proceed.

In step 250, the method 200 may determine whether at least one permissive is maintained during the operation of the adaptive MBC. Step 250 may continuously the operation of the adaptive MBC.

In an embodiment of the present invention, the GUI may notify the user if the permissive is not maintained. In an alternate embodiment of the present invention, the method 200 may automatically revert to step 205 if the operational permissive is not maintained.

FIG. 3 is a block diagram of an exemplary system 300 of controlling a hydroelectric plant in accordance with an embodiment of the present invention. The elements of the method 200 may be embodied in and performed by the system 300. The system 300 may include one or more user or client communication devices 302 or similar systems or devices (two are illustrated in FIG. 3). Each communication device 302 may be for example, but not limited to, a computer system, a personal digital assistant, a cellular phone, or any device capable of sending and receiving an electronic message.

The communication device 302 may include a system memory 304 or local file system. The system memory 304 may include for example, but is not limited to, a read only memory (ROM) and a random access memory (RAM). The ROM may include a basic input/output system (BIOS). The BIOS may contain basic routines that help to transfer information between elements or components of the communication device 302. The system memory 304 may contain an operating system 306 to control overall operation of the communication device 302. The system memory 304 may also include a browser 308 or web browser. The system memory 304 may also include data structures 310 or computer-executable code for controlling a hydroelectric plant that may be similar or include elements of the method 200 in FIG. 2.

The system memory 304 may further include a template cache memory 312, which may be used in conjunction with the method 200 in FIG. 2 for controlling a hydroelectric plant.

The communication device 302 may also include a processor or processing unit 314 to control operations of the other components of the communication device 302. The operating system 306, browser 308, and data structures 310 may be operable on the processing unit 314. The processing unit 314 may be coupled to the memory system 304 and other components of the communication device 302 by a system bus 316.

The communication device 302 may also include multiple input devices (I/O), output devices or combination input/output devices 318. Each input/output device 318 may be coupled to the system bus 316 by an input/output interface (not shown in FIG. 3). The input and output devices or combination I/O devices 318 permit a user to operate and interface with the communication device 302 and to control operation of the browser 308 and data structures 310 to access, operate and control the software to utilize a hydroelectric plant. The I/O devices 318 may include a keyboard and computer pointing device or the like to perform the operations discussed herein.

The I/O devices 318 may also include for example, but are not limited to, disk drives, optical, mechanical, magnetic, or infrared input/output devices, modems or the like. The I/O devices 318 may be used to access a storage medium 320. The medium 320 may contain, store, communicate, or transport computer-readable or computer-executable instructions or other information for use by or in connection with a system, such as the communication devices 302.

The communication device 302 may also include or be connected to other devices, such as a display or monitor 322. The monitor 322 may permit the user to interface with the communication device 302.

The communication device 302 may also include a hard drive 324. The hard drive 324 may be coupled to the system bus 316 by a hard drive interface (not shown in FIG. 3). The hard drive 324 may also form part of the local file system or system memory 304. Programs, software, and data may be transferred and exchanged between the system memory 304 and the hard drive 324 for operation of the communication device 302.

The communication device 302 may communicate with at least one unit controller 326 and may access other servers or other communication devices similar to communication device 302 via a network 328. The system bus 316 may be coupled to the network 328 by a network interface 330. The network interface 330 may be a modem, Ethernet card, router, gateway, or the like for coupling to the network 328. The coupling may be a wired or wireless connection. The network 328 may be the Internet, private network, an intranet, or the like.

The at least one unit controller 326 may also include a system memory 332 that may include a file system, ROM, RAM, and the like. The system memory 332 may include an operating system 334 similar to operating system 306 in communication devices 302. The system memory 332 may also include data structures 336 for controlling a hydroelectric plant. The data structures 336 may include operations similar to those described with respect to the method 200 for controlling a hydroelectric plant. The server system memory 332 may also include other files 338, applications, modules, and the like.

The at least one unit controller 326 may also include a processor 342 or a processing unit to control operation of other devices in the at least one unit controller 326. The at least one unit controller 326 may also include I/O device 344. The I/O devices 344 may be similar to I/O devices 318 of communication devices 302. The at least one unit controller 326 may further include other devices 346, such as a monitor or the like to provide an interface along with the I/O devices 344 to the at least one unit controller 326. The at least one unit controller 326 may also include a hard disk drive 348. A system bus 350 may connect the different components of the at least one unit controller 326. A network interface 352 may couple the at least one unit controller 326 to the network 328 via the system bus 350.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of controlling a hydroelectric plant, the method comprising:

providing a hydroelectric plant comprising a plurality of components;

determining whether at least one permissive is satisfied; after which operation of the hydroelectric plant is not solely controlled by the pre-defined control curve;

providing an adaptive model based control (MBC); wherein the MBC uses a plurality of operating data to build a new operating model that forecasts a desired range of at least one of the plurality of components; wherein the MBC:

receives the plurality of operating data;

determines whether at least one additional operating model is available;

creates the new operating model from the plurality of operating data;

determines an operation variable that partially controls at least one of the plurality of components;

stores the new operating model; and determines whether to abort the use of the MBC.

2. The method of claim 1, wherein the plurality of components comprises at least one of: at least one opening for controlling the flow of water, at least one servo-motor for controlling the at least one opening, a turbine, and a generator, or combinations thereof.

3. The method of claim 1, wherein the plurality of operating data comprises data on at least one of: command data or feedback data.

4. The method of claim 3, wherein the command data comprises data on at least one of: a head setpoint, a generator output setpoint, a servo-motor position setpoint, or combinations thereof.

5. The method of claim 3, wherein the feedback data comprises data on at least one of:

a head value, a generator output, a servo-motor position, a generator frequency, or combinations thereof.

6. The method of claim 1, further comprising retrieving a plurality of operating data from the at least one additional operating model.

7. The method of claim 6, further comprising incorporating the plurality of operating data from the at least one additional operating model when developing the operating model.

8. The method of claim 1, wherein the at least one permissive comprises at least one of: a status of the hydroelectric plant, a status of a head feedback signal, a status of a generator output feedback signal, a status of a servo-motor position feedback signal, a generator frequency feedback signal, or combinations thereof.

9. The method of claim 8, further comprising the step of determining whether the at least one permissive is maintained.

10. The method of claim 1, wherein the operation variable comprises at least one of:

a opening position setpoint; a generator frequency; a head setpoint; a generator output; or combinations thereof.

11. A system for controlling a hydroelectric plant, the system comprising:

a hydroelectric plant comprising at least one of: at least one opening for controlling the flow of water, at least one servo-motor for controlling a movement of the at least one opening, a turbine for converting a potential energy of the water into a kinetic energy, and a generator for converting the kinetic energy into an electrical energy;

a control system for controlling the operation of the hydroelectric plant; wherein the control system comprises at least one processor, wherein the at least one processor is configured to:

determining whether at least one permissive is satisfied; after which operation of the hydroelectric plant is not solely controlled by a pre-defined control curve;

providing an adaptive model based control (MBC); wherein the MBC uses a plurality of operating data to build a new operating model that forecasts a desired range of at least one of the plurality of components; wherein the MBC:

receives receiving a the plurality of operating data on the hydroelectric plant;

determines whether at least one additional operating model is available;

creates the new operating model from the plurality of operating data; and utilizing the operating model to determines an operation variable that;

wherein the operation variable partially controls at least one of the plurality of components;

stores the new operating model; and determines whether to abort the use of the MBC.

12. The system of claim 11, wherein the at least one processor is configured to receive the plurality of operating data comprising data on at least one of: command data or feedback data.

13. The system of claim 12, wherein the command data comprises data on at least one of: a head setpoint, a generator output setpoint, a servo-motor position setpoint, or combinations thereof.

14. The system of claim 12, wherein the feedback data comprises data on at least one of: a head value, a generator output value, a servo-motor position value, a generator frequency value, or combinations thereof.

15. The system of claim 11, wherein the control system allows for integration with at least one additional control system.

16. The system of claim 15, wherein the at least one additional control system comprises a plant control system.

17. The method of claim 1, further comprising integrating with at least one additional control system, wherein the method upgrades the at least one additional control system.

* * * * *